Figure 1:
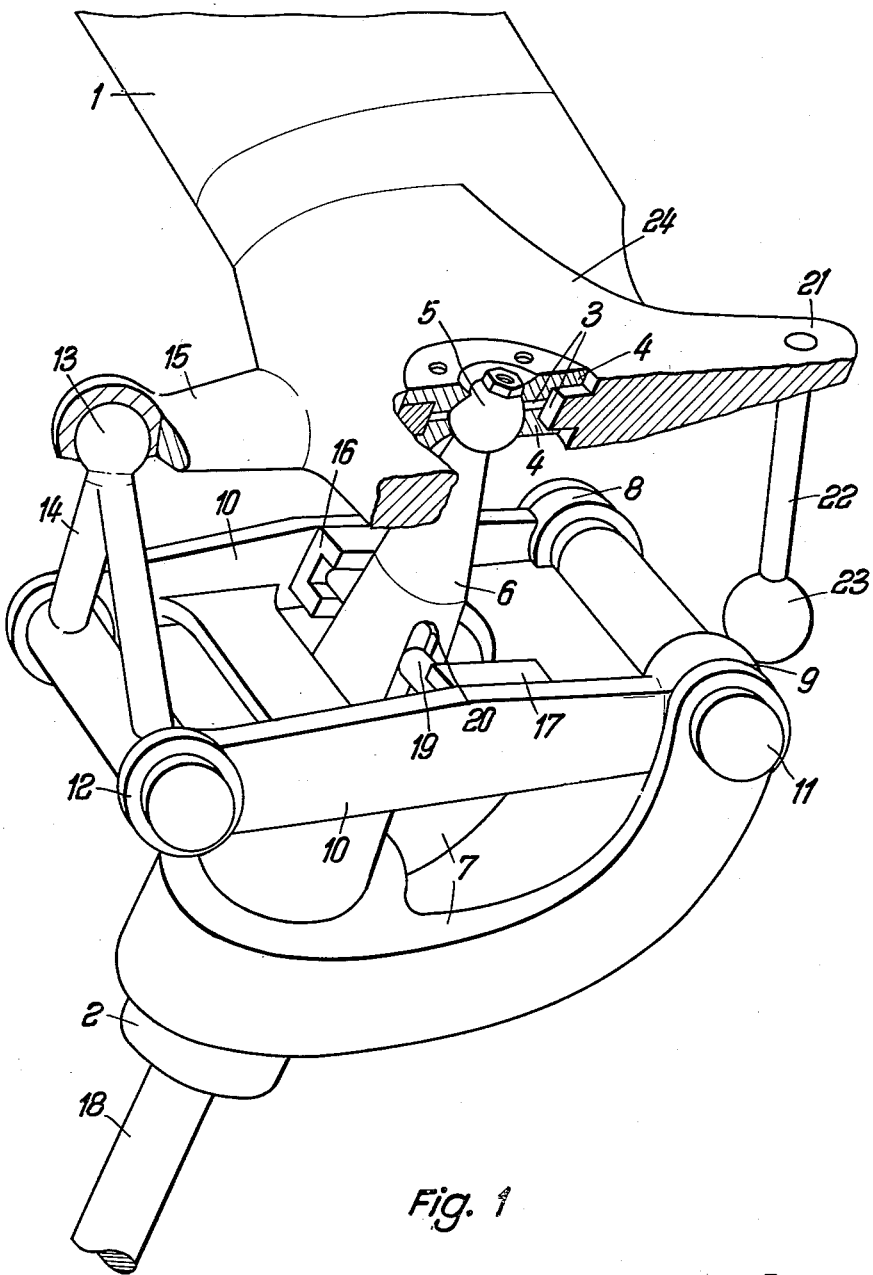

Jan. 22, 1963  H. DERSCHMIDT  3,074,487
ROTORS FOR ROTORCRAFT

Filed June 10, 1960  2 Sheets-Sheet 1

Inventor:
Hans Derschmidt
By Stevens, Davis, Miller & Mosher
Attorneys

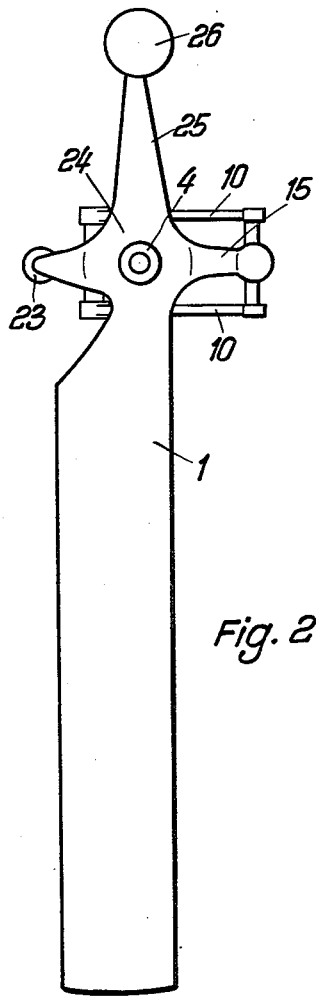

United States Patent Office 3,074,487
Patented Jan. 22, 1963

3,074,487
ROTORS FOR ROTORCRAFT
Hans Derschmidt, Munich, Germany, assignor to Bolkow-Entwicklungen K.G., Ottobrunn, near Munich, Germany
Filed June 10, 1960, Ser. No. 35,292
Claims priority, application Germany, June 12, 1959
14 Claims. (Cl. 170—159.1)

The invention relates to a single-blade rotor arrangement for rotary-wing aircraft which is suitable both for tail rotors and for main rotors.

Known rotors consisting of one blade and a counterweight are connected to a driven shaft by way of so-called flapping hinges for the purpose of transmitting the driving power and by way of a joint serving to adjust the blade angle for the purpose of transmitting the control movements. The bearing of the rotor is therefore formed by a universal joint which occupies a relatively large space and necessitates a relatively large recess in the rotor blade. As this portion of the rotor blade must take up the high centrifugal forces, the rotor hub must be reinforced so as to achieve adequate strength in spite of the reduction of the cross-section by the recess. Owing to this, drawbacks arise as regards weight, strength and the oscillation behaviour of the rotor.

The problem on which the invention is based is to make the known single-blade rotor arrangements simpler and lighter, so that weight is saved and smooth running is considerably improved, which results in rotary-wing aircraft which are more efficient and are serviceable for a longer time than heretofore.

According to the invention, the rotor blade and the rotor shaft are to be connected to one another by means of a ball-and-socket joint.

According to the invention, the control linkage serving to adjust the blade angle or pitch is to be so designed that it also transmits the torque of the rotor shaft to the rotor blade.

According to the invention, in order further to improve the smooth running of the single-blade rotor, a mass producing an unbalance is to be arranged on the rotor blade, said mass being mounted on an arm of the blade extending laterally substantially parallel to the axis of the rotor opposite a horn of the control linkage. Owing to the mounting of the mass on the rotor blade, the distance of the mass from the rotor axis changes in dependence upon the angle of adjustment or pitch angle of the blade, so that with a small pitch angle, corresponding to a large effective lever arm, a large unbalance is produced, and with a large pitch angle, corresponding to a small effective lever arm, a small unbalance is produced. Together with the constant unbalance originating more particularly from the control linkage of the rotor blade, said unbalance gives a resultant force passing through the axis of rotation of the rotor, said force being of the same magnitude as the resultant drag of the blade at a given time, but oppositely directed thereto. In this way there is obtained only a couple which is absorbed by the rotor shaft.

Other features and problems of the invention can be gathered from the following description in conjunction with the drawing, which shows an embodiment of the single-blade rotor arrangement according to the invention and in which:

FIG. 1 is a perspective view, partly in section, of the rotor head of a single-blade rotor, and FIG. 2 is simplified plan view of the rotor blade arrangement according to FIG. 1.

The rotor blade 1 shown in FIG. 1 without the counterweight has a relatively small circular aperture 3 in the hub 24 located above a hollow rotor shaft 2. In the aperture, provided on both sides with a cylindrical recess, there are mounted cup-shaped bearing shells 4 which enclose a ball 5. The latter is bolted to a shaft end 6 which is connected to the hollow rotor shaft 2.

Fixedly arranged on the rotor shaft 2 is a bearing fork 7 rotating with said shaft. An articulated stirrup 10 is pivotally mounted at the ends 8, 9 of the bearing fork 7 by means of a pin 11, said stirrup consisting of two parallel arms and bracing plates. The hollow shaft 2 extends between the arms and the bracing plates. The articulated stirrup 10 carries at its end 12 disposed opposite the pin 11 a link 14 provided with a ball-and-socket joint 13 and likewise hingedly mounted on the articulated stirrup 10. The joint ball 13 is mounted in a bearing cup provided on a horn 15 arranged on the rotor blade 1. Thus, the rotor blade 1 can be suitably adjusted about the bearing balls 5 and 13, so that the same effect is achieved in this case as in the known "flapping hinges," but without weakening the hub portion of the rotor blade.

Guide bars 16, 17 of U-shaped cross-section are secured to each of the opposite inner sides of the arms of the articulated stirrup 10. A control rod 18 slidably mounted inside the rotor shaft 2 is provided at the point disposed opposite the guide bars 16, 17 with a pin 19 engaging in said guide bars, said pin extending to this end through slots 20 in the shaft end 6 of the rotor shaft 2.

On the side of the rotor hub 24 which is opposite the horn 15 there is provided an extension 21 carrying an arm 22 extending laterally of the rotor shaft 2 and substantially parallel thereto and on the end of which there is mounted a weight 23.

As can be seen from FIG. 1 described above, the driving power of the rotor shaft 2 is transmitted to the hub 24 of the rotor blade 1 by way of the bearing fork 7, the articulated stirrup 10, the link 14 and the horn 15. To adjust a desired blade angle or pitch, the control rod 18 can be shifted upwardly or downwardly with respect to FIG. 1 within the rotor shaft 2. In this way, the articulated stirrup 10 is adjusted by means of the control pins 19 engaging in the guide bars 16, 17 and the rotor blade 1 mounted on the ball 5 is thereby adjusted about its longitudinal axis by way of the link 14 and the horn 15. According to the angle of adjustment or pitch imparted to the rotor blade 1 by way of the control rod 18, the weight 23 approaches or moves away from the rotor shaft 2. In this way, with a small angle of adjustment, a large lever arm becomes operative and with a large angle of adjustment a small lever arm.

When the angle of adjustment of the rotor blade 1 is altered, the weight 23 moves in a plane extending through the axis of rotation of the rotor blade. To this plane, however, all those out-of-balance forces can be related which are exerted by the arm 7, the pin 11, the articulated stirrup 10 and the link 14 during the rotation of the rotor blade 1, since these parts can be arranged and constructed symmetrically with respect to this plane. The weight 23 compensates these out-of-balance forces. Owing to its distance from the axis of rotation of the rotor blade 1 being variable with the angle of adjustment of the rotor blade, said weight possesses a larger centrifugal force with a smaller angle of adjustment of the rotor blade and a smaller centrifugal force with a larger angle of adjustment of the rotor blade. Although the physical operation of this variation in interaction with the drag of the rotor blade, which drag is likewise variable on variation of the angle of adjustment, and with the forces and couples occurring in the process has not yet been precisely clarified, it has been found in practice that owing to the variation in the distance of the weight 23 from the axis of rotation of the rotor blade 1 in dependence upon the angle of adjustment of the rotor blade, surprisingly great smoothness of running of the motor blade 1 is obtained.

To supplement the view given in FIG. 1, FIG. 2 shows the entire single-blade rotor, consisting of the rotor blade 1 and the hub 24 with the arm 25 extending in the opposite direction and carrying a counterweight 26.

As is apparent, the universal joint required in known blade suspensions and which occupies a great amount of space and is very heavy is replaced by a ball-and-socket joint which requires only a very small recess within the rotor blade.

I claim:

1. A single-blade rotor for helicopters, comprising a hub having a ball-and-socket joint cup, a rotor blade extending in one direction from said hub, an extension from said hub substantially in the opposite direction, a counterweight on said extension, a driven hollow shaft carrying a joint ball mounted in the ball-and-socket joint cup of the hub, connecting means transmitting the rotation of the hollow shaft to the rotor blade, control means adapted to swing the rotor hub about the joint ball, another weight which is so connected to the rotor blade by way of an arm that its distance from the axis of rotation of the rotor hub changes when the rotor hub is swung about the joint ball.

2. A single-blade rotor for helicopters, comprising a hub having a ball-and-socket joint cup, a rotor blade extending in one direction from said hub, an extension extending from said hub substantially in the opposite direction, a counterweight on said extension, a driven hollow shaft carrying a joint ball mounted in the ball-and-socket joint cup of the hub, an articulated stirrup pivotally connected to an extension of the hollow shaft, a linkage articulated to said articulated stirrup and to the rotor blade, a control rod slidable axially in the hollow shaft for adjusting the angle of incidence of the blade, which articulated stirrup transmits the rotation of the hollow shaft to the rotor blade and swings the rotor hub about the joint ball on axial displacement of the control rod.

3. A single-blade rotor for helicopters, comprising a hub having a ball-and-socket joint cup, a rotor blade extending in one direction from said hub, an extension extending from said hub substantially in the opposite direction, a counterweight on said extension, a driven hollow shaft carrying a joint ball mounted in the ball-and-socket joint cup of the hub, a fork fixedly connected to the hollow shaft, an articulated stirrup pivotally connected to the fork and accommodating the hollow shaft within it, a linkage articulated to said articulated stirrup and to the rotor blade, a control rod slidable axially in the hollow shaft, pins on the control rod which extend through slots in the hollow shaft and engage in the articulated stirrup, so that on axial displacement of the control rod the rotor hub is swung about the joint ball by way of the articulated stirrup and the linkage.

4. A single-blade rotor for helicopters, comprising a hub having a ball-and-socket joint cup, a rotor blade extending in one direction from said hub, an extension extending from said hub substantially in the opposite direction, a counterweight on said extension, a driven hollow shaft carrying a joint ball mounted in the ball-and-socket joint cup of the hub, an articulated stirrup arranged substantially parallel to the rotor blade and having two parallel arms between which the hollow shaft extends, a fork fixedly connected to the hollow shaft and to which one end of the articulated stirrup is pivotally attached, a linkage pivotally attached to the other end of the articulated stirrup, a projection on the rotor hub in which the linkage is pivotally mounted by means of a ball seat, a control rod slidable axially in the hollow shaft, pins on the control rod extending through slots in the hollow shaft and engaging in slotted guides on the articulated stirrup, so that on axial displacement of the control rod the rotor hub is swung about the joint ball by way of the articulated stirrup and the linkage.

5. A single-blade rotor for helicopters, comprising a hub having a ball-and-socket joint cup, a rotor blade extending in one direction from said hub, an extension extending from said hub substantially in the opposite direction, a counterweight on said extension, a driven shaft, articulating means arranged at the centre of gravity of the arrangement consisting of the rotor blade, the hub and the counterweight, said articulating means connecting the shaft to the hub and permitting tilting of the rotor blade about a longitudinal axis of the rotor blade extending at right angles to the axis of the hollow shaft, connecting means to transmit the rotation of the shaft to the rotor blade, control means to tilt the rotor blade about said longitudinal axis, another weight which is so connected to the rotor blade by way of an arm that with a larger pitch angle of the rotor blade the weight is at a smaller distance from the shaft than with a smaller pitch angle of said rotor blade.

6. A single-blade rotor for helicopters comprising a hub, a rotor blade extending in one direction from said hub, an extension extending from said hub substantially in the opposite direction, a counterweight on said extension, a driven shaft, articulating means arranged at the centre of gravity of the arrangement consisting of the rotor blade, the hub and the counterweight, said articulating means connecting the shaft to the hub and permitting tilting of the rotor blade about a longitudinal axis of the rotor blade extending at right angles to the axis of the hollow shaft, connecting means to transmit the rotation of the shaft to the rotor blade, control means to tilt the rotor blade about said longitudinal axis, an arm arranged rigidly on the rotor blade, another weight arranged rigidly on said arm, the centre of gravity of said weight being located at a distance from the plane of rotation of the rotor and said weight moving in a plane extending through the axis of rotation of the shaft on tilting of the rotor blade, so that with a larger pitch angle of the rotor blade the weight is at a smaller distance from the shaft than with a smaller pitch angle.

7. A single-blade rotor for helicopters, comprising a hub, a rotor blade extending in one direction from said hub, an extension extending from said hub substantially in the opposite direction, a counterweight on said extension, a driven shaft, articulating means arranged at the centre of gravity of the arrangement consisting of the rotor blade, the hub and the counterweight, said articulating means connecting the shaft to the hub and permitting tilting of the rotor blade about a longitudinal axis of the rotor blade extending at right angles to the axis of the hollow shaft, connecting means to transmit the rotation of the shaft to the rotor blade, control means to tilt the rotor blade about said longitudinal axis, another weight which is so connected rigidly to the rotor blade by way of an arm that on tilting of the rotor blade it is moved in a plane extending through the axis of rotation of the rotor blade, the longitudinal axis of the rotor blade intersecting said plane at right angles and said articulating means and said connecting means being so designed that their unbalance with respect to the axis of rotation of the shaft falls in said plane and the out-of-balance forces produced by the additional weight during rotation compensating at least partially the last-mentioned unbalance and the forces occurring by reason of the drag of the rotor blade.

8. A single-blade rotor for helicopters, comprising a hub having a ball-and-socket joint cup, a rotor blade extending in one direction from said hub, an extension extending from said hub substantially in the opposite direction, a counterweight on said extension, a driven hollow shaft carrying a joint ball mounted in the ball-and-socket joint cup of the hub, connecting means to transmit the rotation of the hollow shaft to the rotor blade, control means to tilt the rotor blade about the joint ball, another weight which is so connected rigidly to the rotor blade by way of an arm that on tilting of the rotor blade it is moved in a plane extending through the axis of rotation of the rotor blade, the longitudinal axis of the rotor blade intersecting said plane at right angles and said connecting means being so designed that their unbalance with respect to the axis of rotation of the shaft falls in said plane and the out-of-balance forces produced by the additional weight during rotation compensating at least partially the last-mentioned unbalance and the forces occurring by reason of the drag of the rotor blade.

9. A single-blade rotor for helicopters, comprising a hub having a ball-and-socket joint cup, a rotor blade extending in one direction from said hub, an extension extending from said hub substantially in the opposite direction, a counterweight on said extension, a driven hollow shaft carrying a joint ball mounted in the ball-and-socket joint cup of the hub, an articulated stirrup arranged substantially parallel to the rotor blade and having two parallel arms between which the hollow shaft extends, a fork fixedly connected to the hollow shaft and to which one end of the articulated stirrup is pivotally attached, a linkage pivotally attached to the other end of the articulated stirrup, a projection on the rotor hub to which the linkage is connected by means of a ball-and-socket joint, a control rod slidable axially in the hollow shaft, pins on the control rod extending through slots in the hollow shaft and engaging in slotted guides on the articulated stirrup, so that on axial displacement of the control rod the rotor hub is tilted about the joint ball, another weight which is so connected rigidly to the rotor blade by way of an arm arranged opposite said projection that on tilting of the rotor blade it is moved in a plane extending through the axis of rotation of the rotor blade, the articulated stirrup, the fork and the linkage being so arranged and designed that their unbalance with respect to the axis of rotation of the shaft falls in said plane and the out-of-balance forces produced by the additional weight during rotation compensating at least partially the last-mentioned unbalance and the forces occurring by reason of the drag of the rotor blade.

10. A single bladed rotor for helicopters, comprising a hub having a relatively small circular aperture, a hollow rotor shaft and a ball and socket joint cup located below the aperture, a rotor blade extending in one direction from the hub, an extension extending from the hub substantially in the opposite direction to the blade and carrying a counter-weight, the hollow rotor shaft carrying a joint ball mounted in the ball and socket joint cup of the hub and means to transmit the rotation of the hollow shaft to the rotor blade and to adjust the angle of incidence of the blade by causing it to rotate about the joint ball.

11. A single bladed rotor according to claim 10, in which an incidence angle varying control rod is slidably mounted within the hollow shaft and connected with a horn extending from the hub by means of a bearing fork fixedly mounted on the rotor shaft, an articulated stirrup and a link.

12. A single bladed rotor as claimed in claim 11, in which the articulated stirrup is pivotally mounted at the ends of the bearing fork by means of a pin, the stirrup including two parallel arms and at least one bracing plate.

13. A single bladed rotor as claimed in claim 12, in which the hollow rotor shaft extends between the arms of the articulated stirrup and the bracing plate and in which the link is disposed opposite the pin and is provided with a ball for engagement in a ball and socket joint in the horn extending from the rotor blade, the link being likewise hingedly mounted on the articulated stirrup.

14. A single bladed rotor according to claim 13, in which the articulated stirrup is provided with guide bars, a pin extending from the control rod through slots in the upper end of the rotor shaft and engaging in the guide bars whereby movement of the pin axially of the rotor shaft is effective to pivot the articulated stirrup about its fixed bearing.

References Cited in the file of this patent
UNITED STATES PATENTS

| 1,786,057 | Fales | Dec. 23, 1930 |
| 2,256,635 | Young | Sept. 23, 1941 |
| 2,724,446 | Hill | Nov. 22, 1955 |
| 2,742,095 | Pitcairn et al. | Apr. 17, 1956 |
| 2,827,777 | Molyneux et al. | Mar. 25, 1958 |

FOREIGN PATENTS

| 1,004,417 | France | Nov. 28, 1951 |